Patented Dec. 14, 1943

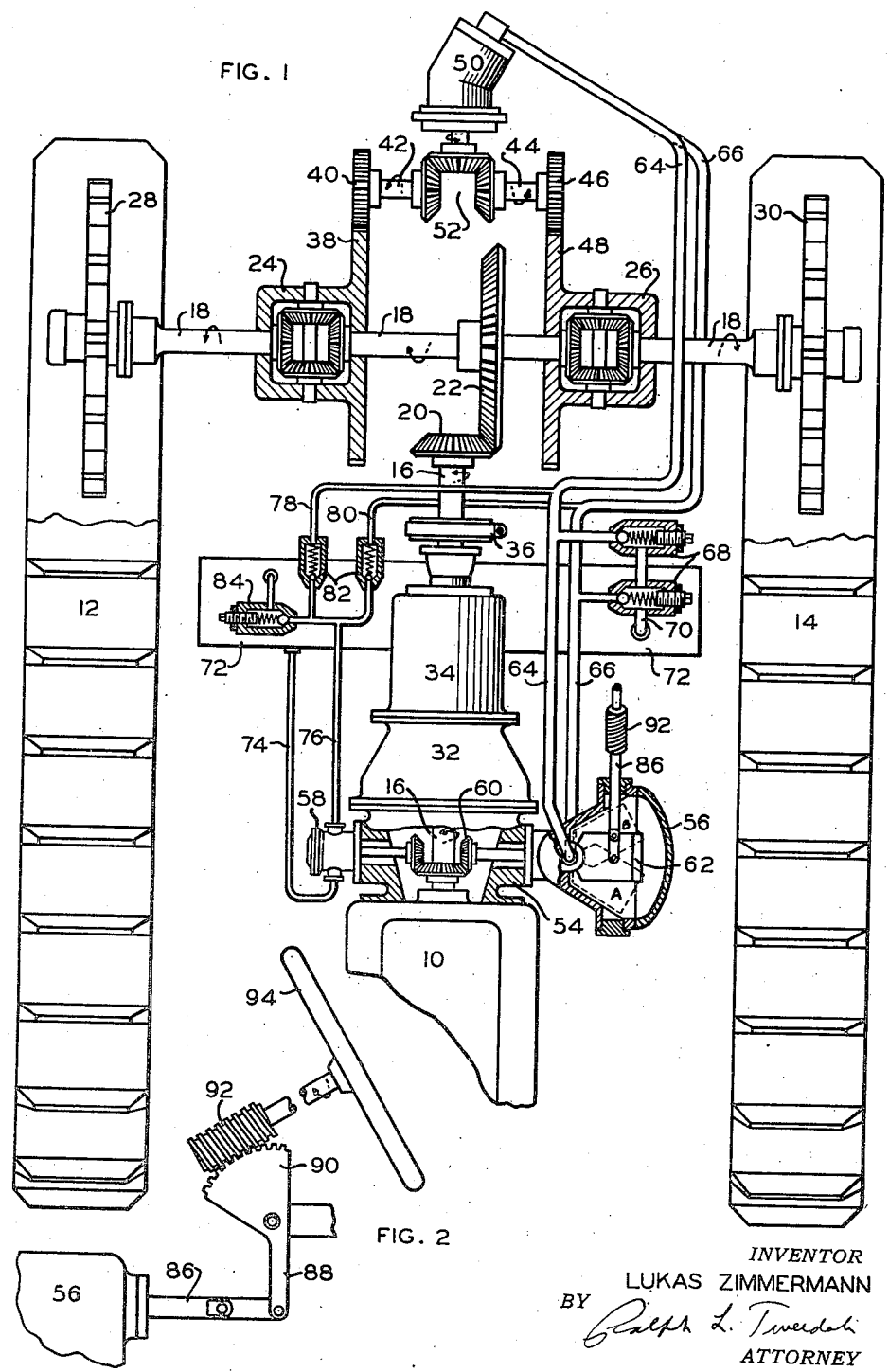

2,336,912

UNITED STATES PATENT OFFICE 2,336,912

POWER TRANSMISSION AND STEERING CONTROL FOR TRACTION DEVICES

Lukas Zimmermann, Detroit, Mich., assignor to Vickers Incorporated, Detroit, Mich., a corporation of Michigan Application September 5, 1941, Serial No. 409,673

3 Claims. (Cl. 180—9.2)

This invention relates to power transmissions, particularly to those of the type comprising two or more fluid pressure energy translating devices, one of which may function as a pump and another as a fluid motor.

The invention is more particularly concerned with a power transmission system adapted for driving a vehicle, for example, of the endless tread type, and wherein steering is accomplished by varying the relative velocity of the treads as between the two sides of the vehicle. Vehicles of this class, as previously constructed, have employed independent clutching or braking mechanism for each side of the vehicle arranged to be selectively engaged or disengaged by means of a suitable steering control mechanism at the will of the operator. Such clutch and brake mechanism are frequently difficult to keep in adjustment, are subject to continual wear, are wasteful of driving energy, and, in most instances, fail to provide precisely graduated control of the relative velocities of the two driving treads.

It is an object of the present invention to provide an improved power transmission system for driving vehicles of this character in which the use of friction clutches and brakes is eliminated and wherein positive control of the relative velocity of the driving treads is achieved at all times both during straight-ahead movement and during turning.

It is a further object to provide in a device of this character an improved positive steering control mechanism utilizing a variable speed transmission, preferably of the hydraulic type, wherein the relative velocities of the track devices at either side of the vehicle are under positive control at all times both during straight-ahead movement and during turning.

Further objects and advantages of the present invention will be apparent from the following description, reference being had to the accompanying drawing wherein a preferred form of the present invention is clearly shown.

In the drawing:

Figure 1 is a diagrammatic plan view of a tractor drive and steering system incorporating a preferred form of the present invention.

Figure 2 is a fragmentary view showing a manual control means for the mechanism of Figure 1.

There is indicated at 10 an internal combustion engine for driving two endless metal tractor treads 12 and 14. The engine 10 has a drive shaft 16 geared to the center section of a three-piece axle 18 through a pinion 20 and a gear 22. The left and right end sections of axle 18 are connected to the center section by differential gear units 24 and 26, respectively. Two drive wheels 28 and 30, one on each end of axle 18, drivingly engage treads 12 and 14, respectively. A clutch 32 and transmission 34 are provided for selective application of power to axle 18. Drive shaft 16 is equipped with a brake 36.

A ring gear 38, formed on the frame member of differential gear unit 24, meshes with a gear 40 on one end of a short shaft 42. A similar shaft 44 has a gear 46 on one end which meshes with a ring gear 48 formed on the frame member of differential gear unit 26. A fixed displacement fluid motor 50 is geared to the two shafts 42 and 44 by bevel gearing 52.

A housing member 54, intermediate engine 10 and clutch 32, has mounted thereon a main pump 56 and an auxiliary pump 58. The two pumps are driven by engine 10 through shaft 16 and bevel gearing 60 in housing 54. Pump 56 is of the variable displacement reversible delivery type having a swinging yoke 62 which is shown in its neutral or zero displacement position. Such pumps are of several well-known general types, the one illustrated being of the type shown in Thoma Patent No. 1,931,969. The two ports of pump 56 are connected by a pair of conduits 64 and 66 to the two ports of motor 50. Conduits 64 and 66 are each provided with a relief valve 68. If a predetermined maximum pressure is exceeded in either conduit, pressure fluid will be relieved through its respective relief valve 68 and passed by a conduit 70 to an oil reservoir 72.

The auxiliary pump 58, which may be of a small fixed displacement type, has a suction conduit 74 for drawing oil from the reservoir 72, and a delivery conduit 76. The latter has two branch conduits 78 and 80, each containing a check valve 82, connecting into conduits 64 and 66, respectively, for supplying oil to the low pressure side of the main hydraulic circuit to make up for losses due to leakage and the possible opening of relief valves 68. The conduit 76 is provided with a relief valve 84 similar to valves 68 but set to open at a much lower pressure.

Steering of the tractor is effected by the operation of motor 50 as controlled by the stroke regulation of pump 56. The shifting of yoke 62 is under control of the tractor operator through any suitable stroke regulating means such as that shown in Figure 2. A stroke regulating rod 86 is linked at one end to the yoke 62 and at the other end to a lever extension 88 of a gear sector 90. The sector 90 is engaged by a worm 92 on the shaft of a steering wheel 94.

In operation, with the yoke 62 of pump 56 in neutral position and the engine 10 running, driving power will be transmitted through shaft 16, clutch 32, transmission 34, pinion 20 and gear 22 to the center section of axle 18. The two outer sections of axle 18, being driven by the center section through differential gearing 24 and 26, will drive the treads 12 and 14 through drive wheels 28 and 30 causing the tractor to move.

It is not possible for oil to flow through pump 56 in either direction when it is in neutral. This prevents flow in either conduit 64 or 66 and accordingly locks motor 50, shafts 42 and 44 and the ring gears 38 and 48 on the frames of differential gear units 24 and 26. With the ring gears 38 and 48 locked against rotation, the differential gear units 24 and 26 serve only to reverse the direction of rotation of the two outer sections of axle 18 from that of the center section. Thus, the three sections of axle 18 are positively geared together with no differential effect. This provides a positive drive to both treads 12 and 14 and eliminates the possibility of an undesired turning of the tractor if one tread should meet greater resistance than the other and stop.

With the shaft 16 and the three sections of axle 18 rotating in a direction indicated by the arrows, if it is desired to steer the tractor to one side or the other, the operator turns wheel 94 in the usual manner. This action turns worm 92 and through sector 90 and lever 88 will shift rod 86 to move yoke 62 off center. If the wheel 94 and worm 92 are turned in the direction indicated by arrows, the yoke will move toward its lowermost position as shown in dotted lines.

The pump 56 will then withdraw oil from conduit 64 and discharge the same into conduit 66 to drive motor 50 in the direction indicated. The two shafts 42 and 44 will be rotated in opposite directions, as indicated, by motor 50 through bevel gearing 52.

The motor 50 will turn differential gear unit 26 through bevel gearing 52, shaft 44 and gears 46 and 48 in the same direction as the right section of axle 18 is turning. Accordingly, tread 14 will tend to be driven by motor 50 in the same direction as it is being driven directly by engine 10. The differential gear unit 24, however, will be rotated in the opposite direction from the left section of axle 18 through bevel gearing 52, shaft 42 and gears 40 and 38. Accordingly, tread 12 will tend to be slowed up by motor 50 against the drive of engine 10.

To turn the tractor in the other direction the wheel 94 and worm 92 are turned in the direction opposite to that indicated by the arrows. This reverses pump 56 by shifting yoke 62 toward its uppermost position as shown in dotted lines. Motor 50 will be reversed and will tend to drive tread 12 and slow up tread 14.

It will be noted that during straight-ahead movement motor 50 is stationary and accordingly locks the carriers of the two differentials 24 and 26. During a steering operation, the yoke 62 may be shifted to any desired extent, thus rotating motor 50 at any desired speed. For example, if the yoke 62 be moved only a small distance, the motor 50 will turn very slowly and thus produce a small, but positively determined, difference in the velocities of the two treads. Further movement of the yoke 62 creates a large difference in relative velocity. Thus, the present invention provides a steering control mechanism by which the relative velocities of the two treads are under precise control at all times, even during straight-ahead movement.

It will also be noted that, during straight-ahead movement, the entire power required to drive the treads is transmitted through the mechanical gearing. This is true because the motor 50 is stationary and accordingly transmits no power. During a turning movement, the gear train 38—40—42—44—46—48 provides a torque equalizing connection between the two treads whereby excess resistance encountered at one tread may be overcome by dividing the torque developed at shaft 18 and transferring it from one end of the shaft through the aforesaid gear train to the other. In this manner the major portion of the power requirements for the machine are transmitted through the mechanical gear train, and the hydraulic transmission may thus be of smaller size than would be necessary if all of the driving power had to be transmitted through the hydraulic transmission at any time.

While the form of embodiment of the invention as herein disclosed constitutes a preferred form, it is to be understood that other forms might be adopted, all coming within the scope of the claims which follow.

What is claimed is as follows:

1. In a motor vehicle of the type having traction devices at opposite sides thereof in which turning is initiated by changing the relative velocity of the traction devices, the combination of a common drive member for the two traction devices and driven by the vehicle prime mover, individual differential gear trains between said member and each traction device, and means including a positive displacement, hydraulic variable speed power transmission driven from the prime mover and connected to variably drive the third leg of said differential trains in respectively opposite directions to variably predetermine the relative velocities of said traction devices.

2. In a motor vehicle of the type having traction devices at opposite sides thereof in which turning is initiated by changing the relative velocity of the traction devices, the combination of a common drive member for the two traction devices and driven by the vehicle prime mover, individual differential gear trains between said said member and each traction device, a positive displacement fluid motor connected with the third leg of said differenital trains to drive them in respectively opposite directions, means driven by the vehicle prime mover and forming a source of fluid under pressure, and operator-controlled means for variably regulating the rate and direction of fluid supply to said motor.

3. In a motor vehicle of the type having traction devices at opposite sides thereof in which turning is initiated by changing the relative velocity of the traction devices, the combination of a common drive member for the two traction devices and driven by the vehicle prime mover, individual differential gear trains between said member and each traction device, a positive displacement fluid motor connected with the third leg of said differential trains to drive them in respectively opposite directions, and a manually-controlled, prime-mover-driven, reversible, variable displacement pump connected to supply fluid to said motor in variable quantity and in either direction.

LUKAS ZIMMERMANN.